United States Patent

Spangler et al.

[15] 3,689,641

[45] Sept. 5, 1972

[54] CONCENTRATED WATER SUSPENSION OF NUTRIENTS

[72] Inventors: Herbert D. Spangler, Philadelphia, Pa. 19120; William G. Walker, Avenel, N.J. 07001

[73] Assignee: Merck & Co., Inc. Rahway, N.J.

[22] Filed: Aug. 20, 1970

[21] Appl. No.: 65,702

[52] U.S. Cl. .........................424/147, 99/11, 99/28, 99/54, 99/83, 99/90 R, 99/93, 99/105, 99/186, 260/211.3, 424/175, 424/252, 424/255, 424/266, 424/280, 424/295, 424/319

[51] Int. Cl. ..........A21d 2/22, A21d 2/28, A23l 1/30

[58] Field of Search..........99/11, 14, 28, 54, 63, 105, 99/83, 93, 86, 90, 150, 155, 140 R, DIG. 1; 424/147, 175, 255, 266, 280, 252, 295, 319; 260/211.3

[56] References Cited

UNITED STATES PATENTS

| | | | |
|---|---|---|---|
| 2,939,820 | 6/1960 | Gerber et al. | 424/295 |
| 2,829,054 | 4/1958 | Feinstone | 99/11 |
| 3,219,454 | 11/1965 | Howard et al. | 99/28 |
| 2,822,317 | 2/1958 | Gulesich et al. | 424/147 |
| 3,080,234 | 3/1963 | Jarowski | 99/14 |

OTHER PUBLICATIONS

Spanyar et al., Stabilization of Vit. C In Foods, Chem. Abst. Vol. 64, pages 18302- 18303, 1966
Stone, Science, 3- 17- 50, Vol. III p. 283
Furia, Handbook of Food Additives, 1968, pages 126- 129
Fujimura, Biochemistry of L–Ascorbic Acid, Chem. Abst. Vol. 46, pages 4587- 4588, 1952

*Primary Examiner*—Morris O. Wolk
*Assistant Examiner*—Stephen B. Davis
*Attorney*—Raymond Underwood, Harry E. Westlake, Jr. and I. Louis Wolk

[57] ABSTRACT

A concentrated aqueous solution for the enrichment of foodstuffs containing a water soluble ferrous salt, thiamine, niacinamide, riboflavin that has been treated so as to remain in suspension, and as an antioxidant a combination of L-cysteine hydrochloride and ascorbic or erythrobic acid. The riboflavin suspension is produced by adding concentrated hydrochloric acid to the riboflavin and then adding the mixture to the aqueous solution containing the other nutrients and a suspending agent which is either methylcellulose, gum tragacanth or sodium carboxymethylcellulose.

5 Claims, No Drawings

CONCENTRATED WATER SUSPENSION OF NUTRIENTS

RELATED CASES

Ser. No. 858,892; filed on Sept. 17, 1969 and now abandoned

Ser. No. 30,978; filed on Apr. 22, 1970 and now abandoned

Ser. No. 32,427; filed on Apr. 27, 1970 and now abandoned

This invention relates to a concentrated water suspension of nutrients and particularly to one that contains vitamins and an iron salt in the proper ratio for the enrichment or fortification of processed foods.

The invention is of special value to the bakery industry using flour because in refining wheat grains to make the popular white flour a considerable amount of the naturally contained nutrients is removed. To compensate for this, or, to supply other nutrients the flour has been enriched by the addition of these nutrients directly to the flour. Generally, the nutrients are added into the doughs from which baked products are to be made; usually they are vitamins.

Iron is an essential nutrient which may be seriously deficient in the average daily diet. It is an integral part of the structure and functions of several enzymes and of hemoglobin. The National Academy of Sciences reported in its Publication No. 1694 on Recommended Dietary Allowances that it is impractical to supply in an otherwise adequate diet the iron needs of the population particularly women, infants, and children. They observe that "it is desirable to increase the iron content of the diet through fortification."

Vitamins and iron are critically absent from refined white flour but whole wheat flour and other grain products such as those from corn, oats, barley and rye are low in these essential nutrients. Consequently, food scientists and nutritionists have sought ways to augment the vitamin and iron content of bakery products. Although vitamins and iron can be added directly to the flour the baker normally purchases unenriched flour and fortifies it himself directly in the baking process.

To produce bakery products with the desired large amount of vitamins and iron the practice has been to add to the dough mix the necessary amount of each separate powdered nutrient in the form of blends, mixtures, or tablets, which contain the nutrients in the ratio desired. Occasionally the nutrients are added separately. None of these practices is entirely satisfactory for several reasons. If the separate nutrients are added in powdered form the danger is always present that all of them will not be measured out exactly. Some of the nutrients are added in very small amounts, especially if the dough batch is small and an accurate measurement of such quantities is particularly time consuming.

Powdered blends or mixtures of nutrients may be nonuniform as to bulk density or ingredient content so that even distribution in the food to be fortified may be difficult to achieve. Some of these nutrients differ sufficiently in particle size, or shape, or specific gravity that they tend to segregate or lose their uniformity of distribution throughout the mass during shipping. The dust from these powdered blends or mixtures have been known to cause allergenic reaction when handled by certain individuals.

When compounded in the form of tablets or wafers these complications of handling powdered nutrients are present although to a lesser extent. In addition, since they are generally counted out, there is the ever present risk that an operator may forget to use them or make an error in counting the proper number. Tablets are of little value in a system requiring a continuous uniform flow of ingredients unless they are first disintegrated and uniformly dispersed in water. An additional adverse factor is that the tabletting of the nutrients is costly.

The present invention involves the formation of an aqueous preparation of the nutrients ordinarily used to fortify bakery products or other foods. This especially involves the selection of a particular suspending agent to prevent riboflavin from settling and it also involves the selection of the proper salt form of the other vitamins and the iron which are included.

As riboflavin is very water insoluble the invention involves the discovery that it will stay in suspension if it is first combined with concentrated HCl and then added to the water with certain suspending agents present. The riboflavin cannot first be added to the water. To 0.094 grams of riboflavin is added one and a half ml. of concentrated HCl but 60 percent more or less volume of the acid may be used. It is then added to water with the other nutrients and as a suspending agent either methylcellulose, gum tragacanth or sodium carboxymethylcellulose is added.

If methylcellulose is used it should have about a 29 percent methoxyl substitution and be used as a 100 cps viscosity water solution. The gum tragacanth is the dried gummy exudate commonly used in pharmaceutical and food practices. If sodium carboxymethylcellulose is used it should have about a 0.75 percent carboxymethyl substitution and a 1,000–2,800 cps viscosity at 25° C. in a 1 percent water solution. One of them would be added in the amount of 0.01 to 0.6 grams per 100 ml. of the total final preparation.

As elemental iron is insoluble in water the invention involves the use of the water soluble ferrous salts such as ferrous sulfate. Thiamine hydrochloride or thiamine nitrate and niacin or its amide may be used in these forms as they are sufficiently water soluble. Other water soluble nutrients can be added and treated in similar fashions.

As the ferrous iron is rather readily oxidized to the ferric ion which precipitates from the system it is important that this oxidation be prevented. This is accomplished by employing a combination of L-cysteine hydrochloride and ascorbic or erythorbic acid as it is synergistic as an antioxidant in this system and neither one alone is fully effective for this purpose. Equal weights of the L-cysteine HCl and the ascorbic acid or erythorbic acid are preferred but the invention may be practiced within a 1:4.7 to a 4.7:1 ratio by weight. Together, they should add up to 3 to 7.5 grams per 100 ml. of the solution and 5 grams is preferred. The water soluble salts, such as sodium and potassium, of these acids may be used but in an increased amount so that the desired actual amount of the acid is present and this is included in the invention and claims.

The ferrous sulfate should amount to between 4 and 24 grams in 100 ml. of the solution. An equivalent weight of another water soluble ferrous salt can be used so that the same amount of the ferrous ion is present. The riboflavin — HCl-premix should amount to 0.03 to 0.11 grams per 100 ml. of solution. The thiamine should amount to 0.05 to 0.7 grams per 100 ml. of solution. The niacinamide should amount to 0.5 to 3.0 gms. per 100 ml. of solution.

The invention contemplates the addition of other water soluble vitamins to the water, such as cyanocobalamin and pyridoxine hydrochloride. Another reducing agent may also be added to further assure the stability of the system. Other water soluble agents such as flavors, dough conditioners, yeast food, water conditioners or coloring materials may be added to the water so that the solution serves as a carrier to introduce them in the bakery product.

It is highly important that the water be free of dissolved atmospheric oxygen but this is not absolutely essential as its presence may be offset by adding the antioxidants at the higher limits of the stated range. To remove the atmospheric oxygen the water may be boiled, or placed under a high vacuum or sparged with nitrogen.

The nutrient solution described in the invention has many advantages. If it is visible, as in a glass tank or it flows through a transparent conduit it has an attractive appearance. It does not create a dust problem. It is economical in contrast to the cost of making compressed tablets. It can be stored in elevated tanks so that floor or table space is not occupied. The tanks will ordinarily be at such a high position that the solution will flow by gravity directly to the use location, thus eliminating pumps, scoops or weighing apparatus. When desirable, the solution flow rate is readily controlled by a variety of liquid metering devices.

An exceptional benefit of the invention is its ease of handling as the worker may remain at the use location and merely turn a valve which is readily at hand. This makes it possible to more accurately add the stipulated amount, as a metering device in the line can be watched until it is time to stop the flow. Of course, an automatic volume controlled shut-off mechanism may be used. As the solution is a uniform one throughout, it is assured that all equal volumes from first to last will contain an equal amount of the nutrients.

Representative examples of the invention are the following. The expression, "riboflavin-HCl" represents a premix of concentrated HCl acid and riboflavin as described above.

EXAMPLE 1

| | |
|---|---|
| Riboflavin-HCl | 0.07 gms. |
| Thiamine Hydrochloride | 0.19 gms. |
| Niacin amide | 1.20 gms. |
| Ferrous Sulfate | 22.50 gms. |
| L-Cysteine Hydrochloride | 3.75 gms. |
| Ascorbic Acid | 3.75 gms. |
| Methylcellulose, 29% methoxyl content, 100 cps water solution | 0.05 gms. |
| Water | q.s. to 100 ml. |

The niacin amide is first dissolved in less water than the final total, during stirring. Then the methylcellulose is added and then the riboflavin-HCl premix. With continued stirring, the thiamine, ferrous sulfate and cysteine HCl are added in order. The preparation was initially observed to be transparent but slightly cloudy and it remained this way for 30 days. It was also stable with respect to assay of the active ingredients at the end of that time.

EXAMPLE 2

| | |
|---|---|
| Riboflavin-HCl | 0.09 gms. |
| Thiamine Hydrochloride | 0.19 gms. |
| Niacin amide | 0.12 gms. |
| Ferrous Sulfate | 22.50 gms. |
| L-Cysteine Hydrochloride | 1.25 gms. |
| Ascorbic Acid | 2.50 gms. |
| Gum tragacanth | 0.05 gms. |
| Water | q.s. to 100 ml. |

It remained equally stable and transparent.

EXAMPLE 3

Example 1 was carried out but for the methylcellulose was substituted 0.025 gms. of sodium carboxymethylcellulose, having 0.75 percent carboxymethyl substitution and a 1,000–2,8000 cps. viscosity at 25° C. in a 1 percent water solution. The same observation as to transparency and stability were made.

EXAMPLE 4

| | |
|---|---|
| Riboflavin-HCl | 0.11 gms. |
| Thiamine Hydrochloride | 0.60 gms. |
| Niacin amide | 0.80 gms. |
| Ferrous Sulfate | 15.00 gms. |
| L-Cysteine Hydrochloride | 2.50 gms. |
| Ascorbic Acid | 1.25 gms. |
| Tragacanth | 0.05 gms. |
| Water | q.s. to 100 ml. |

The same observations as to transparency and stability were made.

EXAMPLE 5

| | |
|---|---|
| Riboflavin-HCl | 0.50 gms. |
| Thiamine Hydrochloride | 0.06 gms. |
| Niacin amide | 2.50 gms. |
| Ferrous Sulfate | 8.00 gms. |
| L-Cysteine Hydrochloride | 2.50 gms. |
| Ascorbic Acid | 2.50 gms. |
| Tragacanth | 0.05 gms. |
| Water | q.s. to 100 ml. |

The same observations as to transparency and stability were made.

In using the solution of this invention about 150 ml. of it is added to 100 pounds of flour to produce 150 1-pound loaves of bread. Or more generally considered, 100 ml. of the solution would be added to make 100 1-pound loaves of bread as this averages 1 ml. of solution per one pound of bread.

While the invention has been disclosed with special reference to the use of the concentrate to enrich bakery products, the concentrate may be used whenever or wherever fortifications of food products is desired. For instance, it may be added to canned vegetables, fruits and/or beverages in the amount necessary so that an average serving will supply the total amount or some portion of the daily nutrient requirements. Another use is to add the concentrate to the coating mixture which is to be applied to cereals and biscuits.

In making the concentrated solution of the invention it may sometimes be thought desirable to have only the ferrous salt and ascorbic acid or erythorbic acid present. The invention contemplates this and in any of the above the examples one or all of the other vitamins, i.e. thiamine and niacinamide may be completely omitted from the examples. Niacin may be substituted for niacinamide in the examples. Instead of ferrous sulfate, it may be convenient to use the fumarate, citrate, lactate and other water soluble salts, or their hydrates may be used, and these are to be considered as substitutes in the examples. The sodium and potassium salts of ascorbic or erythorbic acid may be used instead of the acid.

These several equivalents of the agents stated in the examples are to be considered as being included in the appended claims.

What is claimed:

1. A concentrated aqueous preparation for the enrichment of food stuffs which contains the following per 100 ml. of the preparation:

| | |
|---|---|
| Water soluble ferrous salt | 4–24 gm. |
| L-cysteine hydrochloride and an acid selected from the group consisting of ascorbic and erythorbic acids in a 1:4.7 to 4.7:1 ratio by weight, totalling | 3–7.5 gm. |
| Riboflavin-HCl premix of 0.094 g. of riboflavin and 1.5 ml. ± 60% of conc. HCl | 0.03 to 0.15 gm. |
| Thiamine | 0.05 to 0.7 gm. |
| Niacinamide | 0.05 to 3.0 gm. |
| Solubilizing agent selected form the group consisting of gum tragacanth, methylcellulose of 29% methoxyl substitution and as a 100 cps viscosity water solution, and sodium carboxymethylcellulose of a 0.75% carboxymethyl substitution and a 1000–2800 cps. viscosity at 25° C. in a 1% water solution | 0.01 to 0.6 gm. |

2. The concentrate of claim 1 in which the L-cysteine hydrochloride and the selected acid add up to 5 grams.

3. The concentrate of claim 1 in which the riboflavin-HCl premix is a mixture of 0.094 g. of riboflavin and 1.5 ml. concentrate HCl.

4. The concentrate of claim 1 in which thiamine hydrochloride or thiamine mononitrate is used.

5. The concentrate of claim 1 in which niacin is used.

* * * * *